(12) United States Patent
Dupeux et al.

(10) Patent No.: US 10,177,495 B2
(45) Date of Patent: Jan. 8, 2019

(54) PLUG HAVING A REAR PORTION MOUNTED ON A FRONT PORTION IN A FLOATING MANNER

(71) Applicant: RADIALL, Aubervilliers (FR)

(72) Inventors: Benoit Dupeux, Vatilieu (FR); Fabien Bourgeas, Saint Nicolas de Macherin (FR); Dominique Lomuscio, Sillans (FR)

(73) Assignee: RADIALL, Aubervilliers (FR)

( * ) Notice: Subject to any disclaimer, the term of this patent is extended or adjusted under 35 U.S.C. 154(b) by 0 days.

(21) Appl. No.: 15/643,252

(22) Filed: Jul. 6, 2017

(65) Prior Publication Data
US 2018/0013235 A1 Jan. 11, 2018

(30) Foreign Application Priority Data

Jul. 7, 2016 (FR) .................................... 16 56518

(51) Int. Cl.
*H01R 13/64* (2006.01)
*H01R 13/631* (2006.01)
(Continued)

(52) U.S. Cl.
CPC ....... *H01R 13/6315* (2013.01); *G02B 6/4278* (2013.01); *G02B 6/4284* (2013.01);
(Continued)

(58) Field of Classification Search
CPC ........ H01R 12/53; H01R 12/75; H01R 12/91; H01R 13/506; H01R 13/516; H01R 13/53;
(Continued)

(56) References Cited

U.S. PATENT DOCUMENTS

| 4,952,170 A | * | 8/1990 | Pritulsky | ............ | H01R 13/7032 |
| | | | | | 439/507 |
| 5,149,283 A | * | 9/1992 | Nakazawa | ........... | H01R 13/642 |
| | | | | | 439/607.58 |

(Continued)

OTHER PUBLICATIONS

English translation of French search report for french application 1656518 dated May 19, 2017.*
(Continued)

*Primary Examiner* — Chandrika Prasad
(74) *Attorney, Agent, or Firm* — Arent Fox LLP

(57) ABSTRACT

The present invention concerns a plug intended to be mounted on at least one cable whose one end supports one or more contacts comprising:
  a body, comprising:
    a front portion extending along a longitudinal axis, the front portion being designed to be lodged in a socket, the front portion being adapted to lodge and hold the contact(s) or at least an optoelectronic converter connected to the contact(s);
    a rear portion forming a sheath, designed to lodge the end of the cable, itself supporting the contact(s); the rear portion being mounted floating about the front portion;
  a plurality of flexible tabs made of electrically conductive material, distributed on the outer periphery of the front portion, the flexible tabs being adapted to remain in mechanical contact with the interior of the socket when the front portion is lodged in the latter.

15 Claims, 5 Drawing Sheets

(51) Int. Cl.
  *H01R 12/91* (2011.01)
  *G02B 6/42* (2006.01)
  *H01R 13/53* (2006.01)
  *H01R 13/629* (2006.01)
  *H01R 13/639* (2006.01)
  *H01R 43/26* (2006.01)
  *H01R 13/506* (2006.01)
  *H01R 13/516* (2006.01)
  *H01R 13/6582* (2011.01)

(52) U.S. Cl.
  CPC .......... *H01R 12/91* (2013.01); *H01R 13/506* (2013.01); *H01R 13/516* (2013.01); *H01R 13/53* (2013.01); *H01R 13/62933* (2013.01); *H01R 13/639* (2013.01); *H01R 43/26* (2013.01); *H01R 13/6582* (2013.01)

(58) Field of Classification Search
  CPC .......... H01R 13/62933; H01R 13/6315; H01R 13/639; H01R 13/648; H01R 43/16; G02B 6/4278; G02B 6/4284
  USPC .......... 439/108, 246, 247, 299, 357, 607.01; 385/53, 75, 76, 88, 92; 361/827
  See application file for complete search history.

(56) References Cited

U.S. PATENT DOCUMENTS

| | | | |
|---|---|---|---|
| 6,174,190 B1* | 1/2001 | Tharp | H01R 13/6272 |
| | | | 439/352 |
| 9,004,778 B2* | 4/2015 | Isenhour | G02B 6/3831 |
| | | | 385/77 |
| 9,170,385 B2* | 10/2015 | Van Der Mee | G02B 6/4201 |
| 2003/0139082 A1* | 7/2003 | Aramoto | H01R 13/6273 |
| | | | 439/358 |
| 2004/0156595 A1* | 8/2004 | Stockhaus | G02B 6/4246 |
| | | | 385/88 |
| 2007/0232118 A1* | 10/2007 | Wu | H01R 13/6275 |
| | | | 439/353 |
| 2011/0123157 A1 | 5/2011 | Belsan et al. | |
| 2012/0252256 A1 | 10/2012 | Zhu et al. | |
| 2013/0016493 A1 | 1/2013 | Cook et al. | |
| 2014/0003771 A1* | 1/2014 | Isenhour | G02B 6/3831 |
| | | | 385/77 |
| 2015/0378109 A1* | 12/2015 | Samal | G02B 6/3809 |
| | | | 385/58 |

OTHER PUBLICATIONS

French Search Report of related French application 1656518 dated May 19, 2017.

* cited by examiner

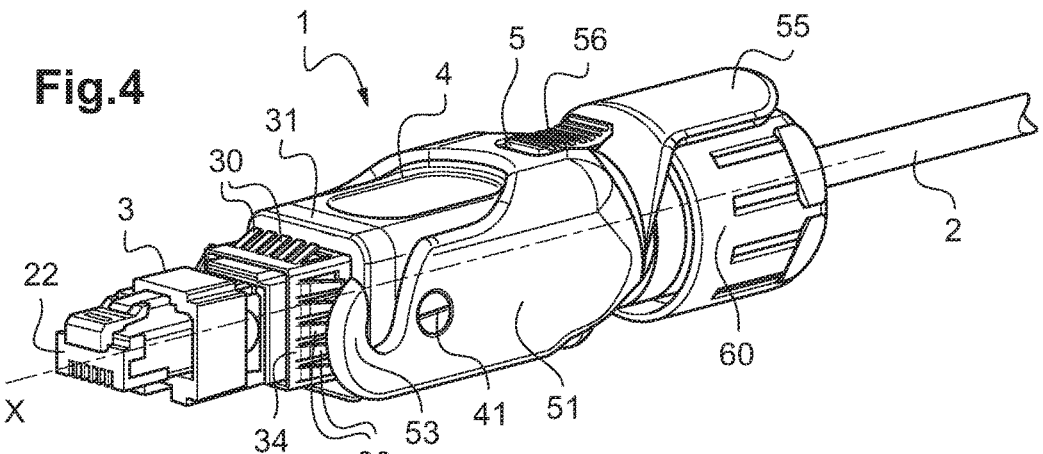
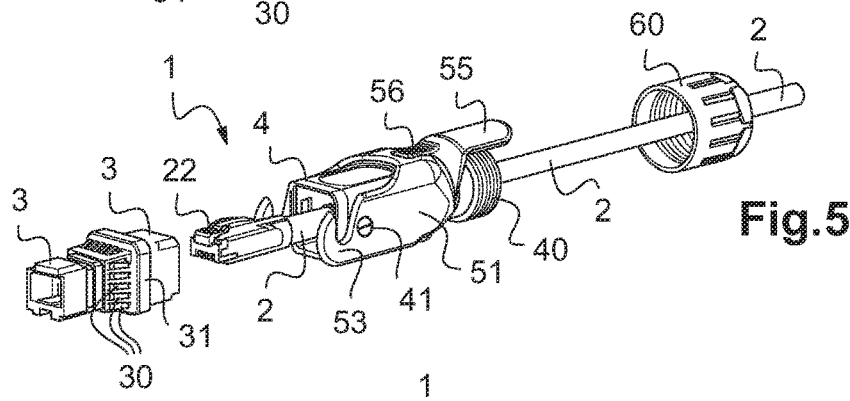
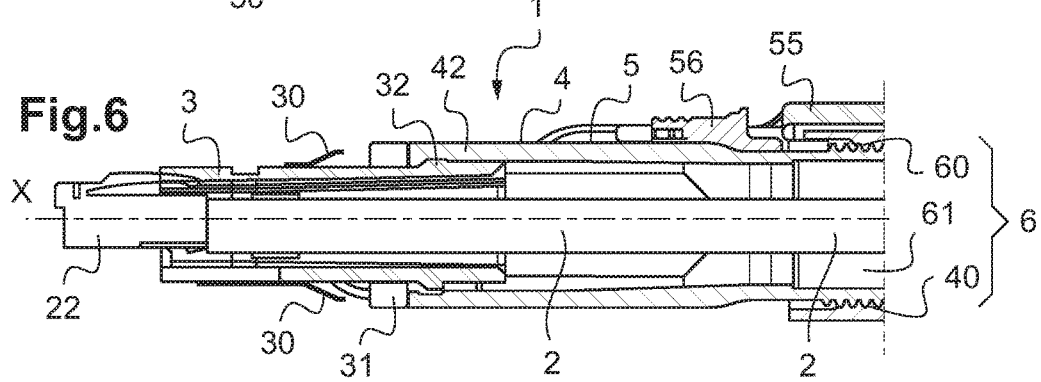
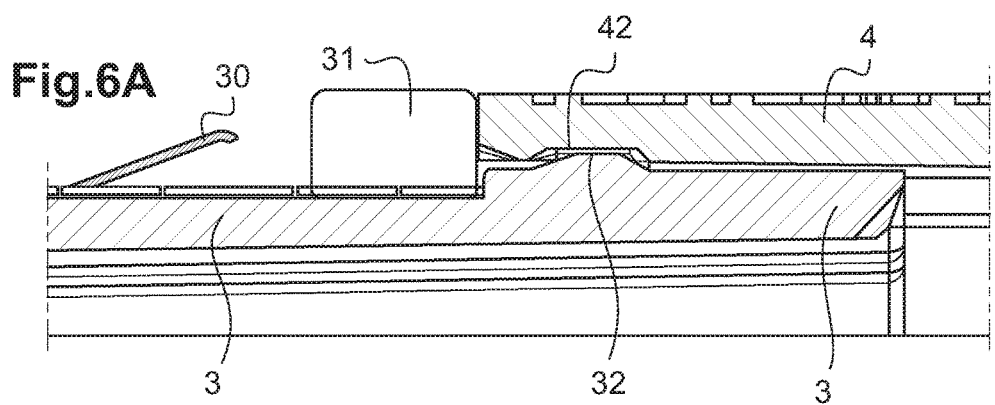

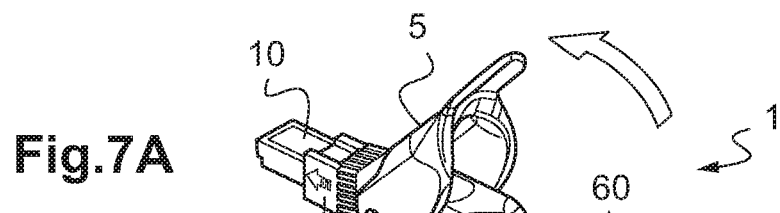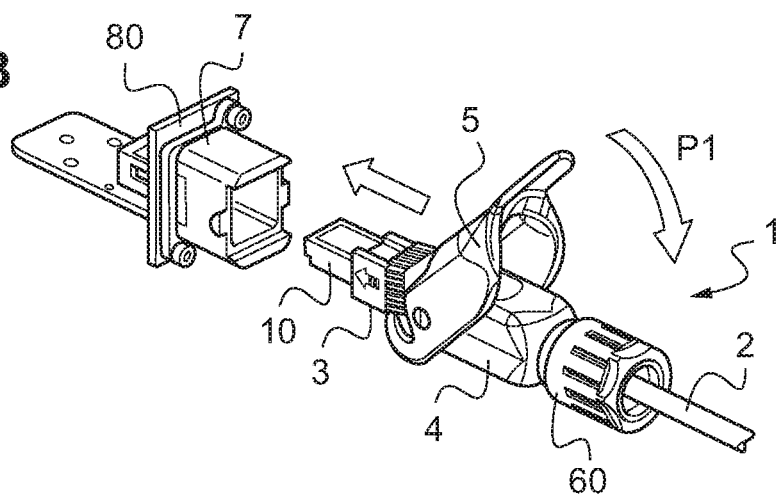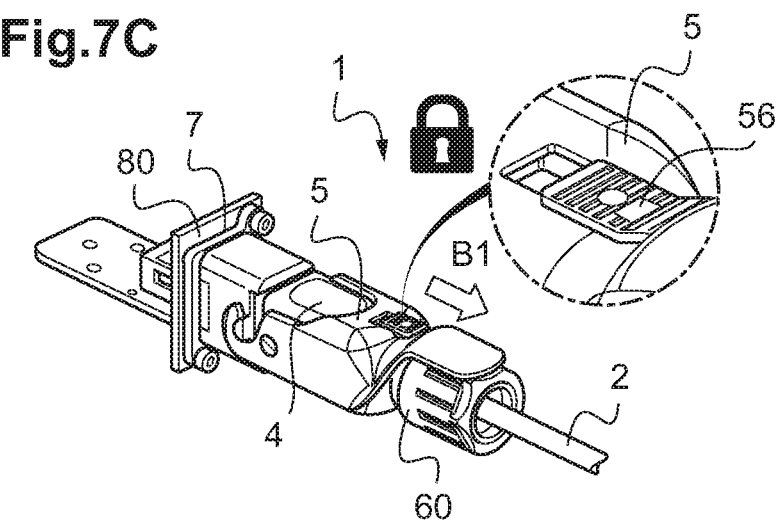

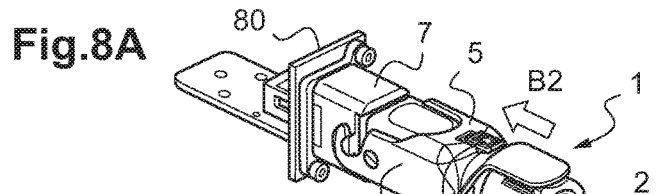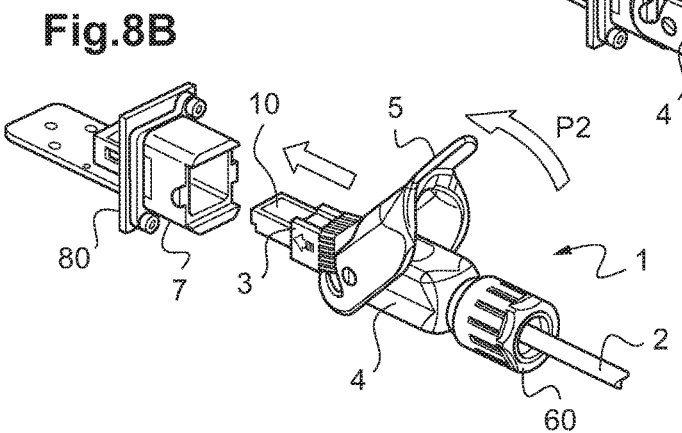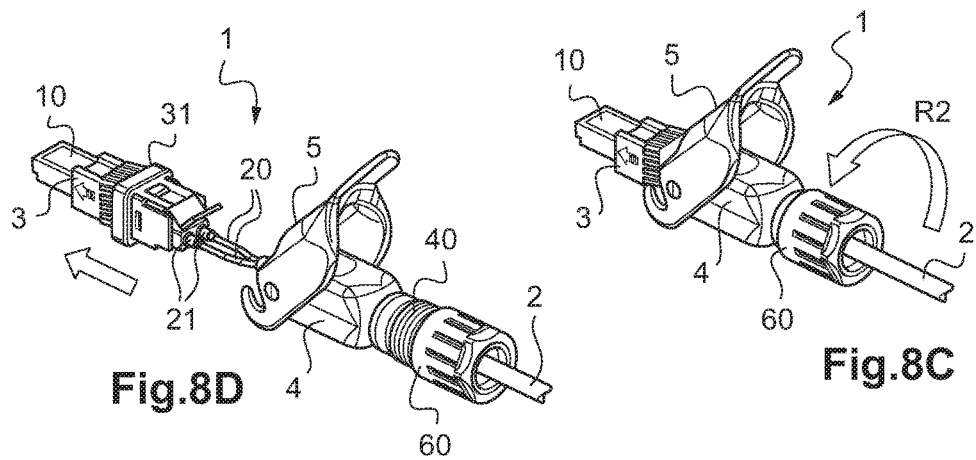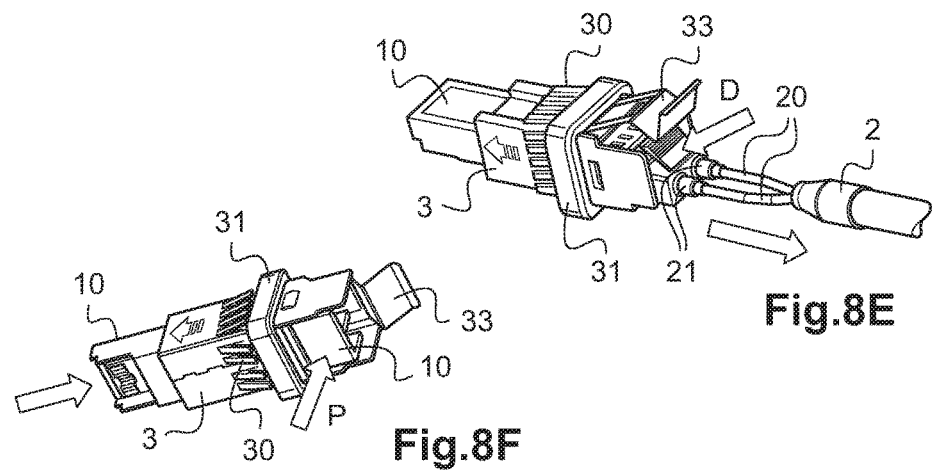

PLUG HAVING A REAR PORTION MOUNTED ON A FRONT PORTION IN A FLOATING MANNER

CROSS-REFERENCE TO RELATED APPLICATIONS

This application claims the priority of French Patent Application No. 1656518, filed Jul. 7, 2016. The disclosure of the priority application incorporated in its entirety herein by reference.

TECHNICAL FIELD

The present invention concerns a plug including a cordless key for emission by wireless network, of the wife or Bluetooth® type, or a plug intended to be mounted on at least one cable supporting one or more contacts, and to be connected to a socket of an electronic equipment box panel.

These contacts may be of type RJ45, for power, data, a combination of the two, or optical. These contacts in particular may be an optoelectronic converter interface of type SFP/SFP+, or optical contacts.

The invention applies in particular to plugs for connection to sockets of electronic equipment implementing a plurality of optical and/or electrical channels with connections which are found in an outdoor environment and/or in harsh conditions, especially in telecommunications installations such as mobile telephony relay antennas, in high-speed data transmission networks for home or industry, in surveillance camera networks or for data transmission in railway installations.

PRIOR ART

It is known, in the majority of electronic equipment intended to be installed in an outdoor environment where it is necessary to make connections between a cable-mounted plug and a corresponding socket, to attach the socket to one of the panels of the equipment box.

In particular, the socket comprises a fixation plate which is screwed to the panel. The sockets may also be of circular shape, threaded with the body screwed directly in the panel or held by a nut. The body may also be assembled with force in the panel.

One may classify the existing installation configurations in two different categories.

In the first, the contacts which transmit the signal are supported by the socket. In this configuration, it is very easy to solve the mechanical problems of aligning the contacts carried by the plug and those carried by the socket by providing the required play and guiding chamfers.

In the second category, the contacts which transmit the signal are supported by a component mounted on a printed electronic circuit card (circuit card) inside the equipment box.

Such a configuration is shown schematically in FIG. 12: the plug 1 mounted on an optical cable 2 is lodged in a socket 7 attached by screwing to the panel 80 of an electronic equipment box 8. The printed circuit card 81 of the equipment 8 carries an electronic component 82 which supports one or more contacts 83 which are connected to those of the plug.

In this configuration, the alignment of the contacts supported by the plug 1 and those supported by the electronic component 82 is problematical. In fact, there then exist relative positioning tolerances between the contacts of these two components 1, 82 along the three spatial axes x, y and z. These tolerances depend very little on the design of the plug, but a lot on how the printed circuit card 81 is integrated in the equipment box.

So far, it is customary to proceed in two different ways for the best positioning of the contacts of the plug 1 with respect to those of the component 91.

Thus, a first method consists in performing an adjustment of the position in x and y of the socket during its mounting on the electronic equipment box. For example, the plate of the socket has holes with a diameter much larger than that of the fastening screws, so that it is possible to shift the socket in x and in y relative to the panel of the box. A tool may be used to centre the socket with respect to the electronic component and the screws are then secured in this position.

This solution is obviously costly and restrictive. Furthermore, the dedicated installation time may be long when the electronic equipment needs to implement a multitude of connectors, and thus of sockets needing to be attached and centred. Moreover, the position in z is not necessarily corrected, which means relying on the dimensional reference chains to ensure the relative positioning between the electronic component and the plug contact(s).

The other method is possible when the portion supporting the contacts of the cable is mounted floating in the plug body. The user performs the visual and manual aligning of these contacts of the cable with those of the electronic component of the equipment. The body of the plug is then locked to the socket without being forcibly centred about the floating portion in the plug body.

Thus, there is a need to improve the installation of a plug on a socket of an electronic equipment box so as to remedy some or all of the drawbacks of the prior art mentioned above, especially in order to allow a positioning with a satisfactory alignment along the three axes between the contact or contacts supported by an electronic circuit card of the electronic equipment and the contact or contacts of a cable on which the plug is mounted.

The purpose of the invention is to meet this need at least in part.

EXPLANATION OF THE INVENTION

To accomplish this, the invention concerns a plug intended to be mounted on at least one cable whose one end supports one or more contacts, comprising:
  a body, comprising:
    a front portion made of electrically conductive material and extending along a longitudinal axis (X), the front portion being designed to be lodged in a socket, the front portion being adapted to lodge and hold the contact or contacts of the cable or at least an optoelectronic converter connected to the contact(s) of the cable;
    a rear portion forming a sheath, designed to lodge the end of the cable, itself supporting the contact(s); the rear portion being mounted floating on the front portion;
  a plurality of flexible tabs made of electrically conductive material, distributed on the outer periphery of the front portion, the flexible tabs being adapted to remain in mechanical contact with the interior of the socket when the front portion of the body is lodged in the latter;
  a lever for locking to a socket, the locking lever being mounted pivoting on the rear portion of the plug body, the lever comprising two locking hooks distributed on either side of the rear portion and designed to cooperate with two locking lugs distributed on either side of the socket;

The floating mount of the rear portion on the front portion of the plug body allows this front portion to remain off axis in the socket cavity, even if the rear portion of the body for its part tends to realign itself with said cavity, in particular during the locking of the plug to the socket with the means of the locking lever.

Thanks to the invention, a correct positioning is assured along the three spatial axes x, y and z of the contact or contacts of the optoelectronic converter(s) supported by the plug, relative to the contact(s) supported by the electronic circuit card of an equipment item whose box is provided with the socket for connection to the front portion of the plug.

This is made possible thanks to the two-part design of the plug body with the judicious combination of a floating mount between these two parts and flexible tabs around the front portion. This floating mount is allowed by the integration of major dimensional play between the cooperating zones of the two parts of the plug body.

The flexible contact tabs on the periphery of the front portion of the plug body have a sufficient bending path so that the mechanical and thus the electrical contact is ensured with the interior wall of the socket cavity, even in the event of maximum misalignment. One may furthermore provide a major play between the interior wall of the socket cavity and the periphery of the front portion of the plug body, which means that the latter may be off centre during its lodging in the socket cavity. The front portion of the plug body may be recentred towards the electronic component with which it is meant to connect thanks to a succession of chamfers which recentre it as it advances into the socket cavity.

A further advantage provided by the floating mount between front and rear portion of the plug body is that any mechanical stresses applied to the rear portion of the plug are not transmitted to the front portion and therefore to the electronic component mounted on the electronic equipment card. This is advantageous, since such a component is particularly vulnerable to mechanical stresses to which it is subjected by virtue of being soldered to the surface of the printed circuit of the card, which is not able to withstand large forces.

According to one variant embodiment, the contact(s) or the optoelectronic converter(s) may project beyond the front portion.

Advantageously, the plurality of flexible tabs constitutes a device for protection against electromagnetic interference (EMI) and/or advantageously also a lightning arrester. Thus, the flexible tabs ensure a perfect grounding continuity and/or electromagnetic shielding. The grounding continuity may preferably be ensured by means of a metallic braid secured around the cable on which the plug is mounted and connected to ground potential at its opposite end.

According to one variant embodiment, the flexible tabs may be supported by a ring of electrically conductive material mounted in sliding manner about the front portion of the plug body.

Alternatively, the plurality of flexible tabs may be integrated with the front portion of the body, that is, be made as a single piece.

For purposes of grounding and/or electromagnetic shielding, the front portion and the ring optionally supporting the flexible tabs may be made of metal, such as aluminium or zamak moulded under pressure, coated with an anticorrosive protection, or made of plastic material(s) with metallization.

According to one advantageous variant embodiment, the plug may comprise a seal carried by the front portion or by the rear portion of the plug body. This seal is adapted to provide tightness at the interface between the plug and the socket in which the front portion of the plug body is intended to be lodged. With such a seal, one ensures perfect tightness at the interface between plug and socket. Moreover, the locking force of the plug against the socket may be transmitted effectively and uniformly to the seal, thereby compressing it. Preferably, the seal may be carried by the ring supporting the flexible tabs.

According to one advantageous feature, the front portion of the plug body comprises means of removable holding of any type of existing connector: this may be an optoelectronic converter of type SFP/SFP+, or an interface of type RJ45 integrating a number of eight electrical contacts, or an interface with multiple power contacts or a signal interface with multiple signal contacts or one or more optical contacts. Thus, regardless of the signal interface which is specific to the cable on which the plug is mounted, one can ensure a good alignment along the three directions x, y, z between the electronic component, the socket and the contact or contacts of the plug.

More particularly, the front portion of the plug body may comprise a flexible blade adapted to exert a bearing pressure against an optoelectronic converter of type SFP/SFP+ inside the front portion, so that one or more locking pins on the periphery of the converter is (are) held abutting by the flexible blade against a shoulder inside the ring so as to hold the converter in blocked position in the ring, while a manual pushing force on the converter is able to remove the converter from the front portion. The removable mounting/ dismounting of the optoelectronic converter inside the front portion may thus be easily and quickly accomplished, in particular in view of its replacement in the event of malfunction.

According to advantageous embodiment, the plug comprises a packing gland with a nut designed to screw onto the rear portion of the body of the plug.

According to these two embodiments, the plug may advantageously comprise a blocking tongue mounted in slidable manner in the locking lever between a blocking position in which it is engaged inside the nut of the packing gland screwed onto the rear portion, so as to block the pivoting of the locking lever when it is in its position of locking to the socket, and an unblocking position in which it is disengaged from the inside of the nut so as to release the pivoting of the locking lever when it is in its position of locking to the socket.

The invention also concerns a plug, designed to be connected to a socket comprising:
- a lever for locking to the socket, the locking lever being mounted pivoting on the plug body, the lever comprising two locking hooks distributed on either side of the plug body and designed to cooperate with two locking lugs distributed on either side of the socket;
- a packing gland with a nut designed to screw onto the rear of the body of the plug;
- a blocking tongue mounted in slidable manner in the locking lever between a blocking position in which it is engaged inside the nut of the packing gland screwed onto the rear of the plug body, so as to block the pivoting of the locking lever when it is in its position of locking to the socket, and an unblocking position in which it is disengaged from the inside of the nut so as to release the pivoting of the locking lever when it is in its position of locking to the socket.

The blocking tongue according to the invention makes it possible to avoid accidental pivoting of the locking lever which is liable to cause unwanted unlocking of the plug from the socket. In fact, the tongue may slide in a groove provided for this purpose on the locking lever, between a position advanced towards the front portion of the plug body and a position retracted from the latter. One may associate this with a mechanical latching effect of the tongue to hold it in its advanced or retracted position.

When the user wishes to block the lever in its locking position, he then moves the tongue into its retracted position, which causes it to be inserted beneath the rim of the packing gland nut, thereby preventing any pivoting of the lever.

In order to further protect against an unwanted unlocking in a permanent fashion, one may advantageously devise a hollow shape in the locking lever, in place of or in addition to the blocking tongue, where a typical clamping collar may be arranged, such as a plastic notched collar.

The invention further deals with an assembly comprising:
- at least one plug as described above;
- at least one socket in which the front portion of the plug body is lodged when the contact or contacts or the optoelectronic converter of the plug is (are) connected to the contact(s) supported by an electronic circuit card of an electronic equipment item, the socket comprising two locking lugs projecting on either side of its cavity to the outside,
- the socket and the plug being designed such that the plug is locked in the socket by means of the locking lever in the position of hooking of the hooks to the locking lugs.

The assembly may advantageously comprise:
- a plurality of plugs such as those previously described; and
- a plurality of adjacent sockets moulded integrally with a panel of the electronic equipment box, each one comprising a hollow tubular portion forming a rim projecting with respect to the panel on the side of the equipment which is opposite the side where the electronic circuit card is arranged; each rim bearing two locking lugs, the locking lugs being continuous between the adjacent sockets;
- the sockets and the plugs being designed such that when each plug is connected to one of the sockets and locked to the latter by means of the locking lever in the position of hooking of the hooks to the locking lugs, the arms supporting two adjacent hooks of two adjacent levers bear against each other in planar or pointlike or linear fashion.

For the making of the sockets as a single piece with an electronic equipment box panel, one may refer more fully to the description of the patent application filed in the name of the applicant the same date as the present, and entitled "System of connecting a plurality of plugs to a monobloc assembly of an electronic equipment box panel and a plurality of connector sockets".

With any given known interfaces such as, for example interfaces of optical type, SFP, RJ45, power, data, or combination interfaces, one may achieve a spacing between two adjacent sockets of the order of 26 mm.

One advantage resulting from the fact of the plugs bearing against each other in planar, pointlike or linear fashion is an increased mechanical strength of the connectors.

In fact, in event of lateral traction force applied to a cord or cable connected to one of the plugs, the latter will bear against the adjacent plug, which thus presents a counterforce to the lateral force.

The invention likewise concerns a method of connecting and locking a plug as previously described to a socket of an electronic equipment box panel, comprising the following steps:

a/ lodging of the front portion of the assembled plug in the socket, so as to place in contact the flexible tabs with the socket interior wall and to connect the contact or contacts of the cable or the optoelectronic converter(s) of the plug to the contact or contacts supported by a printed circuit card of the electronic equipment;

b/ pivoting of the locking lever of the plug so as to hook the locking lugs of the socket by the locking hooks of the lever.

Preferably, after step b/ there may be provided a step c/ of blocking of the locking lever in the position of locking of the plug to the socket, by the displacement in translation of a blocking tongue.

The invention likewise concerns a method of disconnection and unlocking of a plug as described above from a socket of an electronic equipment box panel, comprising the following steps:

a/ pivoting of the locking lever of the plug so as to unhook the locking hooks of the lever from the locking lugs of the socket;

b/ removal of the front portion of the assembled plug from the socket, so as to disconnect the contact or contacts of the cable or the optoelectronic converter(s) of the plug from the contact or contacts supported by a printed circuit card of the electronic equipment, and release the flexible tabs from the socket cavity.

Preferably, before step a/ there may be provided a step a/0 of unblocking of the locking lever in the position of locking of the plug to the socket, by the displacement in translation of a blocking tongue.

Finally, the invention concerns a method of removal of an optoelectronic converter, especially an optoelectronic converter SFP/SFP+ from the front portion of a plug as previously described, mounted on at least one optical cable, comprising the following steps:

a/ dismounting of the front portion from the rear portion of the plug body, b/ disconnection between the optical contacts supported by the optical cable and the converter, c/ manual pushing on the converter while holding the front portion so as to unlock the pin(s) on the periphery of the converter from their position abutting against a shoulder on the inside of the front portion.

The electrical connection of the front portion enables a preliminary grounding before connecting the equipment components, and conversely it guarantees a disconnection of electrical contacts prior to the removal of the ground potential.

Thus, one safeguards all the operations to avoid discharges of electrostatic current which are liable to damage the electronic components of the equipment.

DETAILED DESCRIPTION

Other advantages and features of the invention will better emerge from a perusal of the detailed description of exemplary embodiments of the invention given as an illustration and not a limitation, making reference to the following figures, where:

FIG. 4 is a perspective view of a second example of the plug according to the invention, the plug comprising a connector of type RJ45, projecting to the front of the plug;

FIG. 5 is an exploded view of the plug according to FIG. 4;

FIG. 6 is a partial longitudinal section view of the plug according to FIGS. 4 and 5;

FIG. 6A is a detailed top view of the plug according to one of FIGS. 4 to 6 showing the floating mount of the rear portion of the plug body around its front portion;

FIGS. 7A to 7C show in perspective view the different steps of connecting and locking a plug according to the invention to a socket of an electronic equipment box panel;

FIGS. 8A and 8B show in perspective view the different steps of disconnecting and unlocking a plug according to the invention, connected and locked to a socket of an electronic equipment box panel;

FIGS. 8C to 8F show in perspective view the different steps of dismounting of a plug according to the invention ending up with the removal of the optoelectronic converter from the front portion of the plug body;

Figure 12:
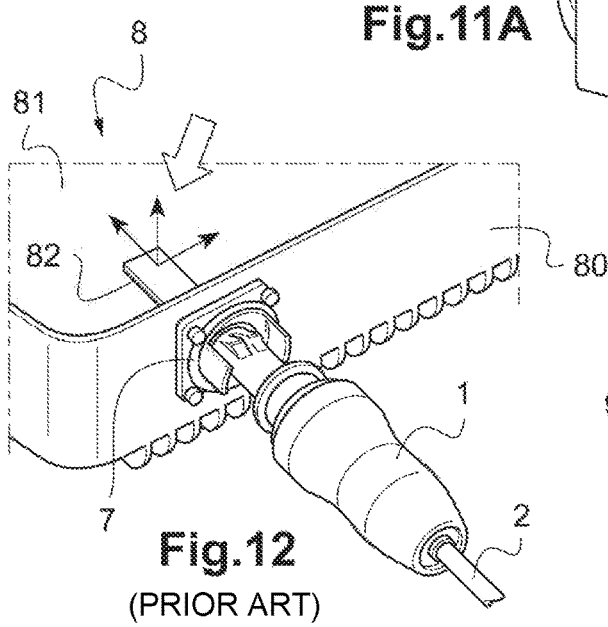
FIG. 12 is a perspective view of an electronic equipment item and a plug connected to a socket of a panel of the equipment box, according to a configuration of the prior art.

FIG. 12 regarding the prior art has already been commented upon in detail in the preamble. Thus, it shall not be done in the following.

For reasons of clarity, the same references denoting the same elements of a plug, socket, or electronic equipment according to the prior art and according to the invention are used for all the FIGS. 1 to 12.

It is stipulated that the terms "front" and "rear" refer to a plug according to the invention. Thus, the front portion of the plug body is the one situated on the side with the interface to the socket, while the rear portion is the one situated on the side where the cable or cord is lodged and held in the plug. The rear portion may also be the side of wireless communication of wife or Bluetooth® type, for example, for plugs containing cordless keys.

There is shown in FIGS. 1 to 3A a plug denoted in general as 1 according to a first exemplary embodiment of the invention.

Figure 9:
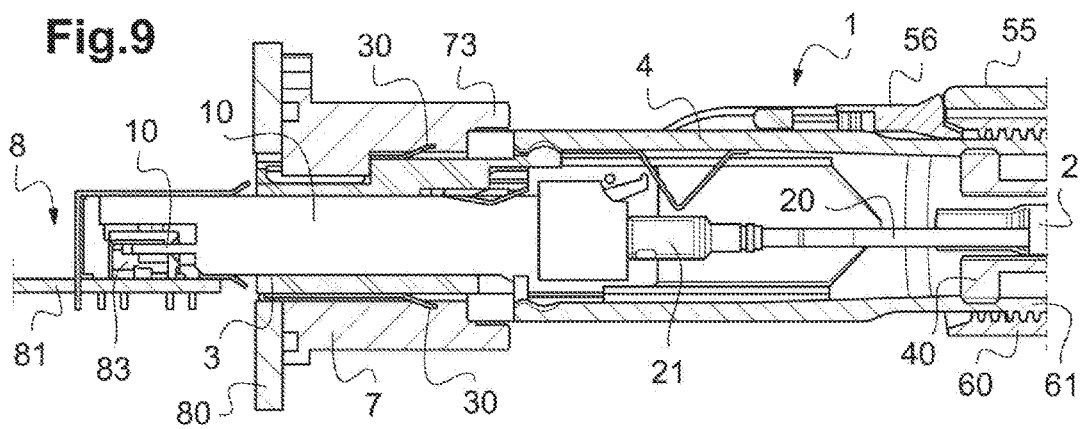
FIG. 9 is a partial longitudinal section view of a plug according to the first example of FIGS. 1 to 3A in its configuration connected and locked to a socket of an electronic equipment box panel, the optoelectronic converter of the plug being connected to the contact of the electronic component mounted on the surface of a printed circuit card of the electronic equipment.
Figure 10A:
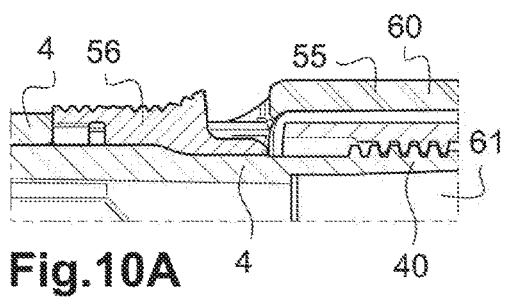
FIGS. 10A and 10B are detailed longitudinal section views showing respectively the position of unblocking and the position of blocking of a locking lever of a plug to a socket according to one aspect of the invention.
Figure 10B:
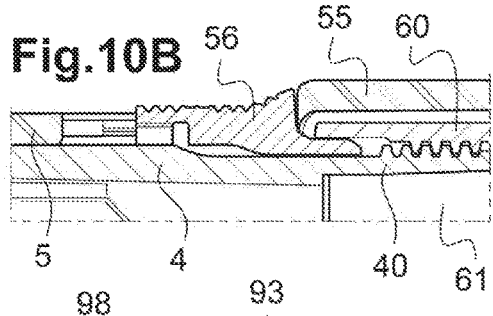

This plug 1 is intended to be connected to a socket 7 integrally moulded with a panel 80 of an electronic equipment box 8 designed to receive a plurality of optical, electrical, power, data signals or any combination of these signals. The connection configuration is illustrated in FIG. 9 and shall be discussed below.

This plug 1 may be designed for mounting on a single cable 2 which may comprise only optical conductors 21.

The plug 1 comprises a body which extends along a straight longitudinal axis X.

According to the invention, the body is made of two pieces 3, 4, one of which constitutes the front portion 3 in the general shape of a ring and the other, the rear portion 4.

An optoelectronic converter 10, also known as a transceiver, may be secured in removable and interchangeable manner to the inside of a lodging of the front portion 3 of the body 60, provided for this purpose. The transceiver 10 projects beyond the front portion 3 of the plug body.

In the example illustrated, the optoelectronic converter 10 is in contact with the front portion 3 of the body of the plug 1, such that the housing of this optoelectronic converter 10 is at the same electrical potential as this front portion 3.

One or more optical contacts 21 may be connected at one end to an optical conductor 20, particularly an optical fibre, of the cable 2 and may be connected at their other end to an input of the transceiver 10. The optical contacts 21 are, for example, contacts of type LC and the optoelectronic converter 10 is for example a transceiver of type SFP.

Figure 2:
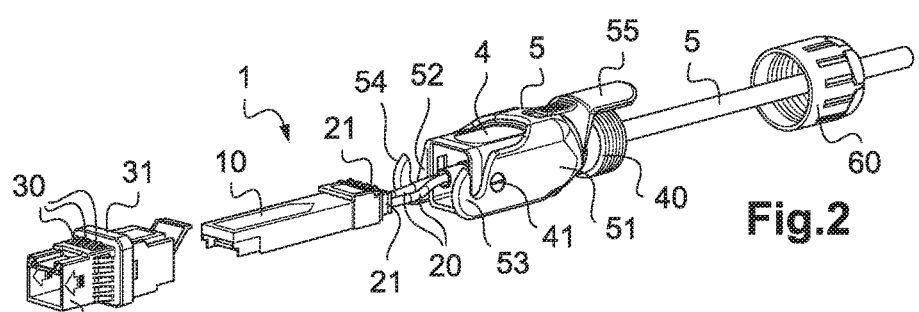
FIG. 2 is an exploded view of the plug according to FIG. 1.
Figure 3:
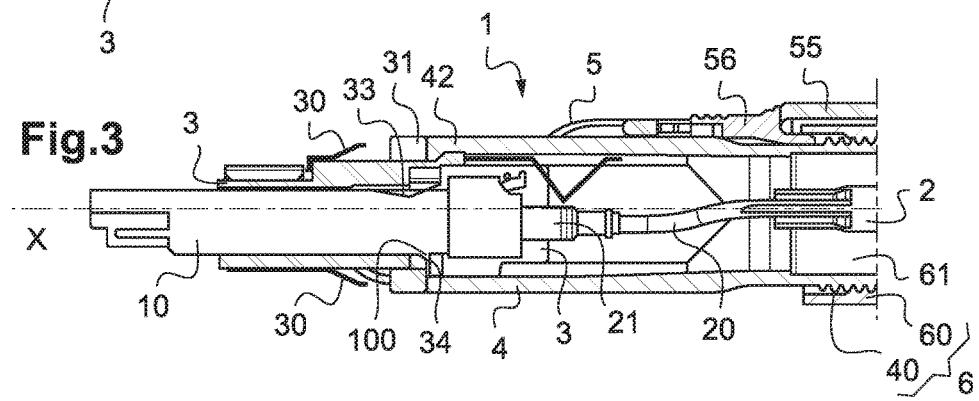
FIG. 3 is a partial longitudinal section view of the plug according to FIGS. 1 and 2.

According to one advantageous variant illustrated in FIGS. 2 and 3, a flexible blade 33 produced integrally inside the ring 3 (front portion) is provided to hold the optoelectronic converter 10 inside the front portion 3 with pressure. To accomplish this, the converter 10 is provided with one or more locking pins 100 on its periphery. Thus, the converter 10 is held in blocked position in the ring 3 thanks to the locking pin(s) 100 which are held by the flexible blade 33 abutting against a shoulder 34 on the inside of the ring 3. A simple manual pushing force on the converter 10 in the upward direction makes it possible to remove the converter 10 easily from the front portion 3.

In the example illustrated in FIGS. 1 to 3A, two identical optical contacts of type LC are each connected to an optical conductor 20 of the optical cable 2.

According to the invention, a plurality of flexible tabs 30 made of electrically conductive material is realized integrally with the front portion 3 of the body, being distributed on the outer periphery of this front portion 3.

These flexible tabs 30 are adapted to remain in mechanical contact with the inside of the socket 7 when the front portion 3 of the body is lodged in the latter.

The front portion 3 of the plug body may be made, for example, of pressure-moulded aluminium or zamak, coated with an anticorrosive protection, or made of plastic material(s), with metallization.

A seal 31 may advantageously be carried by the front portion 3. This seal 31 allows a tightness at the interface between the plug 1 and the socket 7 in which the front portion of the plug body is designed to be lodged during the connection.

As for the rear portion 4, this forms a sheath, designed to lodge the end of the cable 2, itself supporting the contacts 21.

The rear portion 4 may be made of plastic material, for example.

According to the invention, the rear portion 4 is mounted floating about the front portion 3.

Figure 3A:
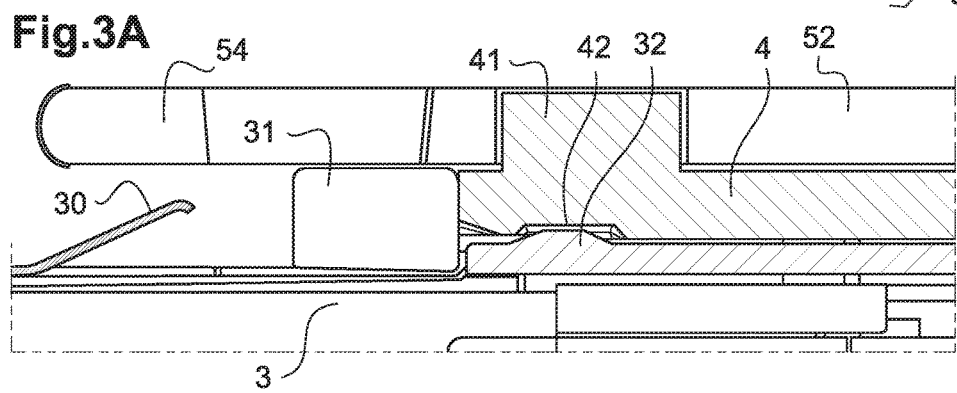
FIG. 3A is a detailed top view of the plug according to one of FIGS. 1 to 3 showing the floating mount of the rear portion of the plug body around its front portion.

One advantageous variant for making such a floating mount can be seen in FIG. 3A: two protuberances 32 distributed on either side of the front portion 3 are each mounted with a free adjustment in a recess 42 devised for this purpose on one side of the rear portion 4 along which a locking hook 53, 54 can pivot.

With the floating mount between front portion 3 and rear portion 4 of the plug body 1, the front portion 3 can remain off axis in the socket cavity 7 even if the rear portion 4 of the body tends to realign itself with the latter, in particular during a locking by means of a lever 5, as explained below.

Moreover, the presence of the flexible tabs 30 ensures the continuity of contact between front portion 3 and socket 7, even in the event of maximum misalignment between the front portion 3 and the electronic component 81 supported by the electronic card 82 of the electronic equipment 8 to which the plug 1 is connected.

As illustrated in FIGS. 1 to 3A, a locking lever 5 with two arms 51, 52 is mounted pivoting about an axis 41 on the rear portion 4 of the body of the plug. The pivoting axis 41 may be moulded integrally with the rear portion 41.

The free end of each arm 51, 52 comprises a locking hook 53, 54.

The lever 5 may be designed with a grasping portion 55 enabling an easy manual pivoting of the lever 5 about the axis 41.

The plug 1 again in the example described comprises a packing gland 6 for holding the cable 2. The packing gland comprises a nut 60, for example one made of plastic material, which is designed to screw onto the rear portion 4 of the body of the plug 2 and compress a seal 61.

Another exemplary embodiment is shown in FIGS. 4 to 6A, in which the plug 1 comprises the same elements as those described in relation to the plug of FIGS. 1 to 3A, except that the cable 2 here is a cable of type RJ 45 and the connector 22 at the free end of this cable 2 is directly lodged and held in the front portion 3.

The floating mount between front portion 3 lodging and holding the connector 22 and the rear portion 4 can be seen in FIG. 6A: here, the two protuberances 32 are distributed on the top and bottom of the front portion 3, mounted with a free adjustment in a recess 42 devised for this purpose in one side of the rear portion 4 transversely to the one along which a locking hook 53, 54 pivots.

Generally speaking, the plug 2 according to the invention may contain any type of contacts/connectors known in its front portion, especially those of optical or electrical type, data, power, or any combination of these.

We shall now describe the steps of connecting and locking a plug 1 assembled according to any one of FIGS. 1 to 3A to a socket 7.

The socket 7 is advantageously moulded integrally with a panel 80 of a box of an electronic equipment item 8.

Step a/: the user brings the assembled plug 1 up to the socket and then lodges the front portion 3 in the socket 7, so as to place the flexible tabs 30 in contact with the socket interior wall 7 and connect the converter 10 to the contacts 82 of an electronic component 83 supported by a printed circuit card 84 of the electronic equipment 8 (FIGS. 7A, 7B).

Step b/: the user then causes the locking lever 5 of the plug to pivot so as to hook the locking lugs 71, 72 of the socket 7 by the locking hooks 53, 54 of the lever (FIG. 7C, pivoting of the lever 5 along arrow P1 of FIG. 7B). The locking of the plug 1 to the socket 7 is thus achieved.

Step c/: then the user blocks the locking lever in the position of locking of the plug 1 to the socket 7, by sliding a blocking tongue 56 to the rear of the plug 1 (FIG. 7C, displacement of the tongue 56 along the arrow B1). The sliding of the blocking tongue 56 causes it to move from its position of unblocking to its position of blocking in which it is inserted inside the nut 60 and the rear portion 4 of the plug body.

The steps of disconnecting and unlocking the plug 1 from the socket 7 are completed in the opposite order as described with reference to FIGS. 8A and 8B.

Step a0/: the user displaces the blocking tongue in the opposite direction to that described for the blocking (FIG. 8A, displacement of the tongue 56 along the arrow B2).

Step a/: he then causes the locking lever 5 of the plug to pivot such as to unhook the locking hooks 53, 54, from the locking lugs 71, 72 of the socket 7 (FIG. 8B, pivoting of the lever 5 along arrow P2).

The steps of dismounting the optoelectronic converter 10 from the plug 1 especially for purposes of its inspection and/or replacement are completed as described with reference to FIGS. 8C to 8F.

Step a/: the user then unscrews the nut of the packing gland (FIG. 8C, unscrewing along arrow R2) and dismounts the rear portion 4 from the front portion 3 (FIG. 8D).

Step b/: he then disconnects the two contacts 21 of the converter 10 from the plug 1. For this, he presses on the tabs 23 for disconnection of the contacts 21 (FIG. 8E, pressing along arrow D).

Step c/: he may then proceed to remove the optoelectronic converter(s) 10 from the front portion 3. For this, if the pin 100 of the converter is not a retractable pin, the user pushes manually on the converter 10 upward at the rear (FIG. 8E, arrow P) while pushing on the front of the converter 10 and holding the front portion so as to accomplish the unblocking of pin(s) 100 on the periphery of the converter from their position abutting against the shoulder 31 on the inside of the front portion 3.

As emerges from the preceding description, the steps of connection/disconnection and locking/unlocking of the plug 1 to/from the socket 7 as well as the steps of realization/removal of the packing gland 6 on the cable 2 are easy and quick, even for an inexperienced user.

Figure 1:
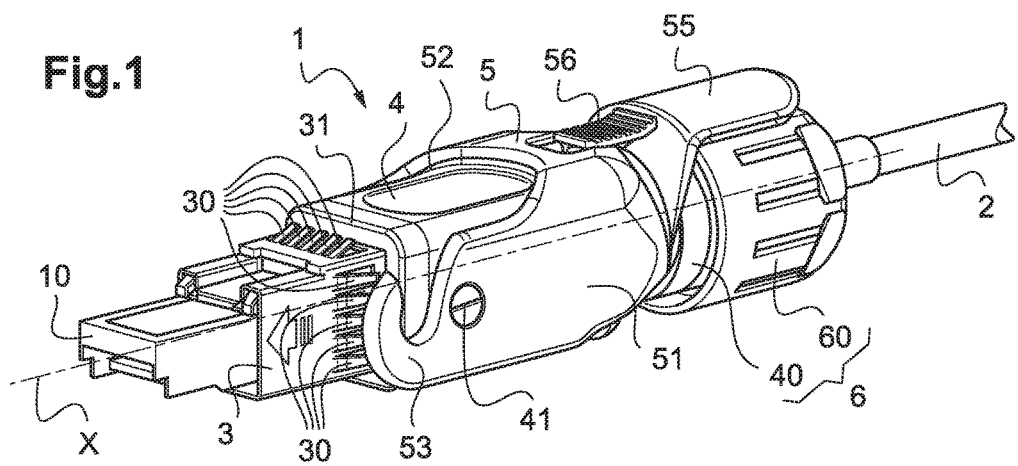
FIG. 1 is a perspective view of a first example of the plug according to the invention, the plug comprising an optoelectronic converter of "transceiver SFP" type, projecting to the front of the plug.

FIG. 9 illustrates the plug 1 of the invention according to FIGS. 1 to 3 in a configuration of connection and locking to a socket 7 of a panel 80 of electronic equipment 8 whose electronic component 82 with contacts 83 connected to the converter 10 is carried by the printed card 81.

In this FIG. 9, one further notices that the socket comprises lips 73 which tend to properly mechanically protect the seal 31. Thus, the latter is less exposed directly to UV light and the weather.

In order to block the pivoting of the locking lever 5 of the plug 1 in its position of locking to a socket 7, one slides the blocking tongue 56 which is inserted in a groove of the lever 5 from its position of unblocking at a distance from the nut 60 (FIG. 10A) to its position of blocking in which it is inserted between the inside of the nut 60 and the rear portion 4 of the plug body.

According to the invention, a stopper 9 for tightness and electromagnetic shielding may be connected and locked in a socket 7 in place of a plug 1 according to the invention.

Figure 11A:
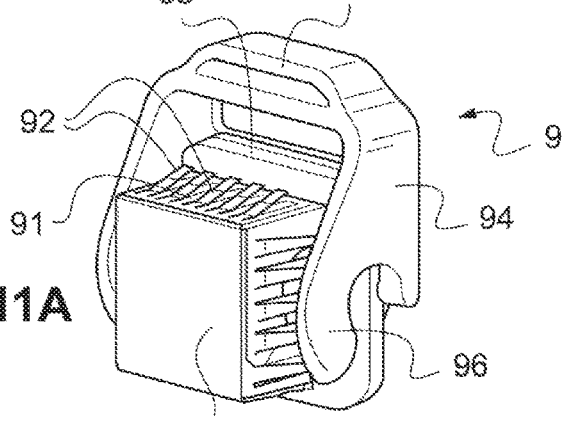
FIGS. 11A and 11B are perspective views, respectively of the front and rear, of a stopper adapted to close and be locked to a socket in place of a plug according to the invention.
Figure 11B:
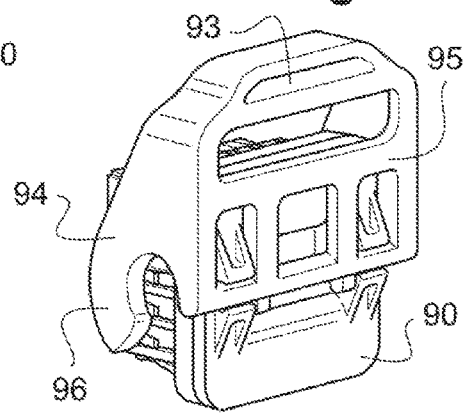

Such a stopper 9 is shown in FIGS. 11A and 11B: it comprises a body 90 made of plastic material around which is mounted a shielding ring 91 having the same type of flexible tabs 92 as those attached to the front portion 3 of the plug 1.

These flexible tabs 92 thus have a sufficient flexibility to be in contact with the interior wall of the socket 7 when the stopper 9 is lodged in its cavity.

Moreover, a locking lever 93 with two locking branches 94, 95 each one supporting a locking hook 96, 97 is mounted so as to pivot on the body 90 of the stopper 9.

Finally, a seal 98 is mounted around the body 90.

Thus, the body 90 of the stopper 9 may be lodged inside the socket 7, the flexible tabs 92 maintaining the contact with the interior wall of the socket and thus ensuring a continuity of grounding or electromagnetic shielding. In this configuration, the locking lever 93 may be pivoted such that these hooks 96, 97 become attached around locking lugs 91, 92 of the socket 7.

The pivoting of the lever 93 up to the locking position applies compression to the seal 98.

The plugs according to the invention and the sockets to which they may be connected may be configured to operate at temperatures between −40° C. and +125° C.

In terms of tightness, the plugs according to the invention and/or the sockets can satisfy standard IP65, IP 67, IP68, or UL50E.

The plug 1 according to the invention as just described may lodge and hold in its front portion 3 any known connector.

Other variants and advantages of the invention may be realized without thereby leaving the scope of the invention.

The invention is not limited to the examples just described; in particular, one may combine the features of the examples illustrated within variants which have not been illustrated.

The invention claimed is:

1. A plug intended to be mounted on at least one cable, having an end supporting one or more contacts, the plug comprising:
   a body, comprising:
   a front portion made of an electrically conductive material and extending along a longitudinal axis, the front portion being designed to be lodged in a socket, the socket forming a cavity, the front portion being adapted to lodge and hold the contact or contacts of the at least one cable or at least an optoelectronic converter connected to the contact(s) of the at least one cable;
   a rear portion forming a sheath, designed to lodge the end of the at least one cable, supporting the contact(s), the rear portion being mounted in a floating mount on the front portion;
   a plurality of flexible tabs made of an electrically conductive material, distributed on an outer periphery of the front portion, the flexible tabs being adapted to remain in mechanical contact with an interior of the socket when the front portion of the body is lodged in the socket;
   a locking lever for locking to the socket, the locking lever being mounted pivoting on the rear portion of the plug body, the locking lever comprising two locking hooks distributed on either side of the rear portion and designed to cooperate with two locking lugs distributed on either side of the socket;
   wherein the floating mount of the rear portion on the front portion of the body of the plug allows the front portion to remain off axis in the cavity of the socket, even if the rear portion of the body tends to realign itself with said cavity of the socket, in particular during the locking of the plug to the socket by means of the locking lever.

2. The plug according to claim 1, wherein the plurality of flexible tabs constitute a device for protection against electromagnetic interference (EMI) and/or a lightning arrester protection device.

3. The plug according to claim 1, comprising a ring of an electrically conductive material mounted in a sliding manner about the front portion of the body, the ring supporting the flexible tabs.

4. The plug according to claim 1, wherein the plurality of flexible tabs are integrated with the front portion of the body.

5. The plug according to claim 1, comprising a seal carried by the front portion or by the rear portion of the body of the plug.

6. The plug according to claim 1, wherein the front portion comprises means of removable holding of an optoelectronic converter of type SFP/SFP+, or an interface of type RJ45 or a power or signal interface of one or more optical contacts.

7. The plug according to claim 1, wherein the front portion comprises a flexible blade adapted to come to exert a bearing pressure against an optoelectronic converter of type SFP/SFP+ inside the front portion, so that one or more locking pins on a periphery of the converter is (are) held abutting by the flexible blade against a shoulder inside the ring so as to hold the converter in a blocked position in the ring, while a manual pushing force on the converter is able to remove the converter from the front portion.

8. The plug according to claim 1, comprising a packing gland with a nut designed to screw onto the rear portion of the body of the plug.

9. The plug according to claim 8, comprising a blocking tongue mounted in a slidable manner in the locking lever between a blocking position in which the blocking tongue is engaged inside the nut of the packing gland screwed onto the rear portion, so as to block a pivoting of the locking lever when the blocking lever is in a position of locking to the socket, and an unblocking position in which the blocking tongue is disengaged from inside the nut so as to release the pivoting of the locking lever when the locking lever is in the position of locking to the socket.

10. An assembly, comprising:
    at least one plug according to claim 1;
    at least one socket in which the front portion of the plug body is lodged when the contact or contacts or the optoelectronic converter of the plug is (are) connected to the contact(s) supported by an electronic circuit card of an electronic equipment item, the at least one socket comprising two locking lugs projecting on either side of the cavity of the socket to an outside,
    wherein the socket and the plug are designed such that the plug is locked in the socket by means of the locking lever in a position of hooking of the hooks to the locking lugs.

11. A method of connecting and locking a plug according to claim 1 to a socket of an electronic equipment box panel, the socket having an interior wall and locking lugs, the method comprising the following steps:
    (a) lodging of the front portion of an assembled plug in the socket, so as to place in contact the flexible tabs with the interior wall of the socket and to connect the contact or contacts of the cable or the optoelectronic converter(s) of the plug to a contact or contacts supported by a printed circuit card of the electronic equipment box panel;
    (b) pivoting of the locking lever of the plug so as to hook the locking lugs of the socket by the locking hooks of the locking lever.

12. The method according to claim 11, comprising after step (b) a step (c) of blocking of the locking lever in the position of locking of the plug to the socket, by a displacement in translation of a blocking tongue.

13. A method of disconnection and unlocking of a plug according to claim 1 from a socket of an electronic equipment box panel, the socket forming a cavity and having locking lugs, the method comprising the following steps:
   (a) pivoting of the locking lever of the plug so as to unhook the locking hooks of the locking lever from the locking lugs of the socket;
   (b) removal of the front portion of an assembled plug from the socket, so as to disconnect the contact or contacts of the cable or the optoelectronic converter(s) of the plug from a contact or contacts supported by a printed circuit card of the electronic equipment box panel, and release the flexible tabs from the cavity of the socket.

14. The method according to claim 13, comprising, before step (a), a step of unblocking of the locking lever in the position of locking of the plug to the socket, by a displacement in translation of a blocking tongue.

15. A method of removal of an optoelectronic converter having optical contacts and pin(s) on a periphery of the optoelectronic converter, especially an optoelectronic converter SFP/SFP+ from the front portion of a plug according to claim 1, mounted on at least one optical cable having optical contacts, the method comprising the following steps:
   (a) dismounting of the front portion from the rear portion of the body of the plug,
   (b) disconnection between the optical contacts supported by the optical cable and the converter, and
   (c) manual pushing on the optoelectronic -converter while holding the front portion so as to unlock the pin(s) on the periphery of the optoelectronic converter from a position abutting against a shoulder on an inside of the front portion.

* * * * *